United States Patent [19]
Cardani

[11] 3,869,019
[45] Mar. 4, 1975

[54] DIGITAL SPEED CONTROL SYSTEM UTILIZING A COUNTDOWN REGISTER

[75] Inventor: Charles S. Cardani, Grand Blanc, Mich.

[73] Assignee: General Motors Corporation, Detroit, Mich.

[22] Filed: June 24, 1970

[21] Appl. No.: 49,246

[52] U.S. Cl.............. 180/105 E, 317/5, 123/102, 235/92 CC
[51] Int. Cl............................................. B60k 31/00
[58] Field of Search......... 180/105, 105 E; 123/102; 317/5; 318/600–603, 329, 311, 314, 318; 246/182; 235/92 MT, 92 CA, 92 EV

[56] References Cited
UNITED STATES PATENTS

| | | | |
|---|---|---|---|
| 3,110,853 | 11/1963 | Jones | 318/318 X |
| 3,206,665 | 9/1965 | Burlingham | 318/314 X |
| 3,365,634 | 1/1968 | Centner et al. | 318/603 X |
| 3,525,044 | 8/1970 | Richmond | 246/182 |
| 3,543,116 | 11/1970 | Haner et al. | 318/318 |
| 3,546,553 | 12/1970 | Loyd | 318/318 |
| 3,551,752 | 12/1970 | Haner | 318/600 X |
| 3,570,622 | 3/1971 | Wisner | 180/105 |
| 3,593,097 | 7/1971 | Gebelein | 318/603 X |
| 3,599,154 | 8/1971 | Carol et al. | 317/5 |

Primary Examiner—Kenneth H. Betts
Attorney, Agent, or Firm—Howard N. Conkey

[57] ABSTRACT

A digital speed control system having an input circuit which supplies a number of pulses to a memory register to generate and store therein a binary number representing a desired speed of the controlled apparatus. The input circuit enables a transfer circuit to transfer the binary number stored within the memory register to a countdown register. The input circuit then supplies a number of pulses representing the actual speed of the controlled apparatus to step the countdown register and subtract from the binary number therein the number representing the actual speed of the controlled apparatus. An in-zone error detector and a proportional control signal generator in conjunction with an error sign detector and an inverter which inverts the binary number contained within the countdown register controls a speed actuator to provide for proportional control when the error in the speed of the controlled apparatus is within a predetermined magnitude. An out-of-zone indicator in conjunction with the inverter and the error sign detector controls the speed actuator to provide for maximum acceleration or maximum deceleration when the magnitude of the error in the speed of the controlled apparatus exceeds the predetermined magnitude.

8 Claims, 6 Drawing Figures

Fig. 1

INVENTOR.
Charles S. Cardani
BY
Paul Fitzpatrick

DIGITAL SPEED CONTROL SYSTEM UTILIZING A COUNTDOWN REGISTER

This invention relates to a digital speed control system utilizing a countdown register for maintaining the speed of a controlled apparatus at a speed selected by the operator of the controlled apparatus.

Speed control system presently used are usually comprised of either a mechanical servo mechanism which is operative by feedback control or an electrical analog system whereby an analog signal which represents the desired speed is generated to be compared with another generated analog signal which represents the actual speed.

This invention is directed toward a digital speed control system in which a number representing the actual speed of a controlled apparatus is periodically subtracted from a number which represents the desired speed of the controlled apparatus to determine a speed error. This speed error is then utilized to control the speed of the controlled apparatus to maintain the desired speed.

The general object of this invention is to provide for a digital speed control system.

It is another object of this invention to provide for a digital speed control system in which the actual speed of a controlled apparatus is periodically subtracted from the desired speed of the controlled apparatus in a countdown register.

It is another object of this invention to provide for an improved digital speed control system having proportional control when the speed error is within a predetermined magnitude.

These and other objects of this invention are accomplished by generating a series of pulses having a frequency corresponding to the speed of the controlled apparatus and utilizing these pulses to step digital registers. When the controlled apparatus is at the desired speed, the series of pulses is supplied to a memory register for a specified duration of time so as to step the memory register for a specified duration of time so as to step the memory register and generate therein a binary number representing the frequency of the series of pulses and therefore the desired speed of the controlled apparatus. The output of the memory register is a binary representation of the number of pulses supplied thereto. Thereafter, the binary number representing the desired speed is stored in the memory register and will remain fixed regardless of future changes in the actual speed of the controlled apparatus. The binary number in the memory register is then transferred into a countdown register after which the series of pulses is supplied to the countdown register for the same duration of time so as to step the countdown register and subtract from the number transferred therein the number of pulses supplied during the specified duration of time, which number represents the actual speed of the controlled apparatus. The binary number then contained within the countdown register represents the error in the speed of the controlled apparatus. The information detected after the countdown register has been stepped by the series of pulses is utilized to control the speed of the controlled apparatus in a manner so as to maintain the desired speed.

In the preferred embodiment as hereinafter discussed, the digital speed control system is illustrated with reference to a vehicle having throttle controlled internal combustion engine. It is understood that the digital speed control system is not limited thereto, but may be utilized to control the speed of any controlled apparatus which may be, for example, an electric motor.

In addition, the digital elements such as upcounters, downcounters, inverters, flip-flops, and logic elements are standard and may be found, for example, in the 1969 *Digital Control Handbook* of the Digital Equipment Corporation. Clocks, time delays and speed sensors are well known in the art and therefore, specific designs of such devices are not shown.

Also in the following description, a 1 bit is equivalent to a positive DC voltage level while a 0 bit is equivalent to a zero or ground level.

The logic elements utilized include AND gates, OR gates and inverters. The function of the AND gate is to supply a 1 bit at its output when all its inputs are 1 bits, the function of the OR gate is to supply a 1 bit at its output when any one of its inputs is a 1 bit and the function of an inverter is to supply a 1 bit or 0 bit at its output when its input is a 0 bit or 1 bit respectively.

The invention may be best understood by reference to the following detailed description of a preferred embodiment and the accompanying drawings, in which.

Figure 1:
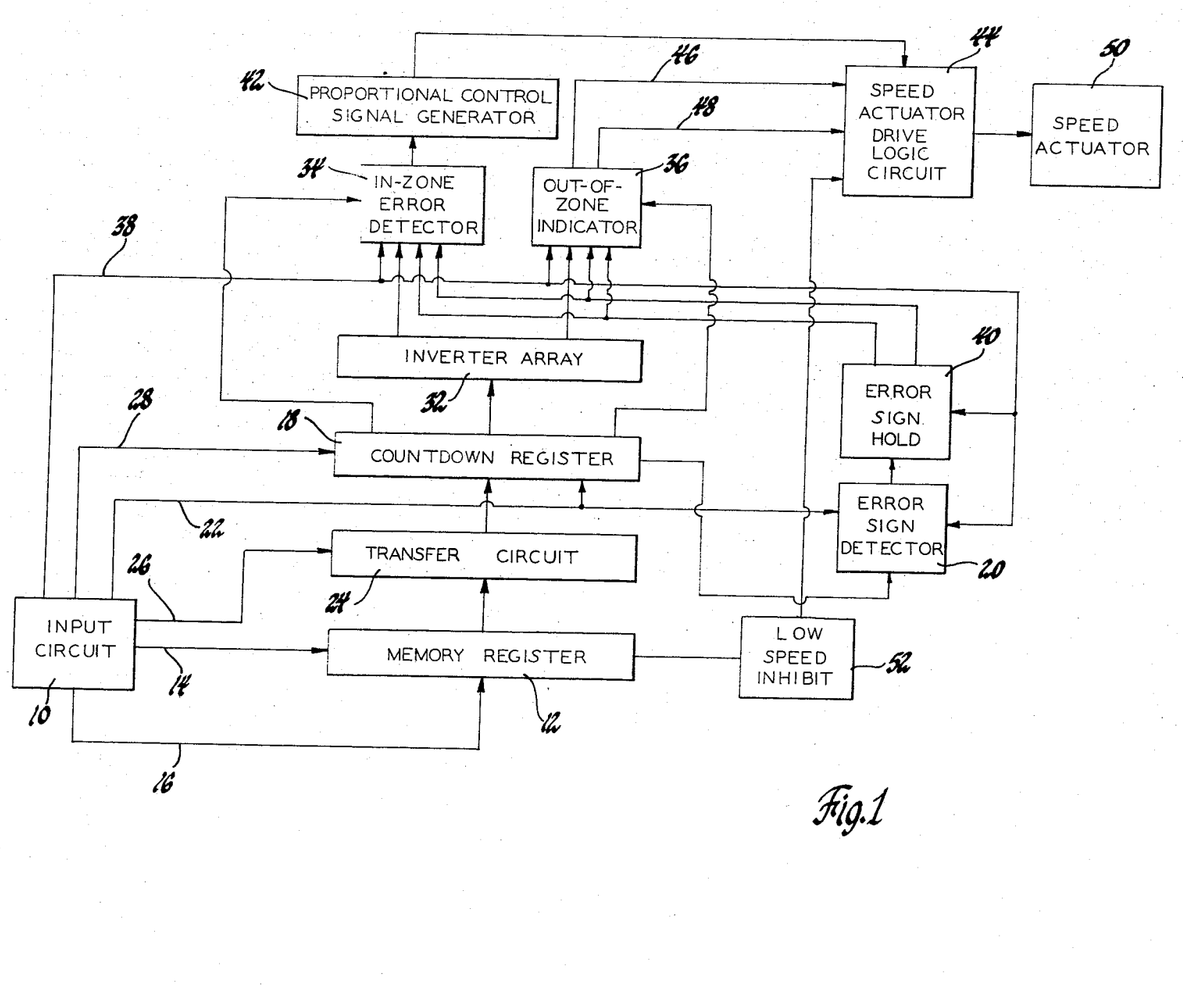
FIG. 1 is a block diagram of a preferred embodiment of this invention.

Referring to FIG. 1, when it is desired to automatically control the speed of the vehicle, the vehicle is manually driven to the desired speed. At the desired speed, an input circuit 10 is caused to supply a series of pulses having a frequency corresponding to the speed of the vehicle to a memory register 12 through a line 14. This series of pulses is supplied to the memory register 12 for a specified duration of time so that the number of pulses contained therein represents the frequency of the series of pulses and therefore the desired speed of the vehicle. The memory register 12 ia a binary counter which counts the number of pulses supplied from the input circuit 10 in binary form and stores that number until such time that a clearing pulse is supplied from the input circuit through a line 16.

Thereafter, to determine a change in the speed of the vehicle, a number which represents the actual speed of the vehicle is periodically subtracted from the number which represents the desired speed of the vehicle, which number is stored in binary form within the memory register 12. The subtraction process is accomplished in a countdown register 18. First, a register clearing pulse is supplied from the input circuit 10 to the countdown register 18 and an error sign detector 20 through a line 22. A pulse is then supplied to a transfer circuit 24 through a line 26 to enable the transfer circuit 24 to transfer the binary number stored in the memory register 12 to the countdown register 18. Upon completion of the transfer, the input circuit 10 supplies a series of pulses havng a frequency corresponding to the actual speed of the vehicle to the countdown register 18 through a line 28 for the same time duration that the series of pulses was supplied to the memory register 12 through the line 14. Therefore, the number of pulses contained in the series of pulses supplied to the countdown register 18 represents the frequency of the series of pulses and therefore the actual speed of the vehicle. Each pulse steps the countdown register 18 to subtract one from the binary number contained therein. Therefore, the series of pulses supplied to the countdown register 18 through the line 28 subtracts from the number which represents the desired speed of the vehicle a number which represents the actual speed of the vehicle. The resulting binary number remaining within the countdown register 18 upon the completion of the series of pulses represents the error in the speed of the vehicle.

The error sign detector 20 receives an input from the countdown register 18 and utilizes this input to determine whether the actual speed of the vehicle is greater than or less than the desired speed.

An inverter array 32 receives the output of the countdown register 18 and inverts the binary number represented thereby.

In order to provide for proportional control of the vehicle when the vehicle speed error is less than a predetermined magnitude, the outputs of the lower ordered binary stages in the countdown register 18 and the corresponding outputs of the inverter array 32 are supplied to an in-zone error detector 34. As hereinafter used, the term in-zone refers to a vehicle speed error having a magnitude equal to or less than the error which can be determined by the lower ordered binary stages in the countdown register 18 and the inverter array 32. This error can be either underspeed or overspeed. The remaining outputs of the higher ordered binary stages in the countdown register 18 and the corresponding outputs of the inverter array 32 are supplied to an out-of-zone indicator 36. As hereinafter used, the term out-of-zone refers to a speed error having a magnitude greater than the speed error which can be determined solely by the lower ordered biary stages in the countdown register 18 and the inverter array 32. This error may be either underspeed, or overspeed.

When the vehicle speed is zero or underspeed, the speed error is determined by the outputs of the countdown register 18, which outputs are selected by the error sign detector 20. Conversely, when the vehicle speed is overspeed, the speed error is determined by the outputs of the inverter array 32, which outputs are selected by the error sign detector 20.

Upon the completion of the stepping of the countdown register 18 by the series of pulses through the line 28, the input circuit 10 supplies a signal through a line 38 to the error sign detector 20, the in-zone error detector 34, the out-of-zone indicator 36 and an error sign hold 40. This pulse enables the error sign hold 40 to store the output of the error sign detector 20 and also to enable the in-zone error detector 34 and the out-of-zone indicator 36 to store the inputs received from the countdown register 18, the inverter array 32 and the error sign hold 40.

Following the pulse supplied through the line 38, the input circuit 10 again supplies a pulse through the line 22 to the countdown register 18 and the error sign detector 20 to clear the countdown register 18 and reset the error sign detector 20 to begin the cycle as previously described.

The in-zone error detector 34 determines the magnitude of the error as represented by the lower order binary stages of the countdown register 18 and the inverter array 32 and supplies a resulting output signal to a proportional control signal generator 42 which generates a signal corresponding to the in-zone error.

A speed actuator drive logic circuit 44 receives an input signal from the proportional control signal generator 42 and receives input signals from the out-of-zone indicator 36 through a line 46 and a line 48 and supplies a signal to a speed actuator 50 which is responsive thereto to maintain the desired speed of the vehicle.

A low speed inhibit 52 receives an input from the lowest ordered binary stage in the memory register 12 which represents a number corresponding to the lowest speed at which the vehicle may be maintained in addition to receiving an input from the remaining higher ordered binary stages in the memory register 12. The low speed inhibit 52 supplies a signal to the speed actuator drive logic circuit 44. When the speed of the vehicle is below the minimum control speed, the signal supplied by the low speed inhibit 52 enables the speed actuator drive logic circuit 44 to supply a maximum deceleration signal to the speed actuator 50 to prevent vehicle speed control.

Figure 2:
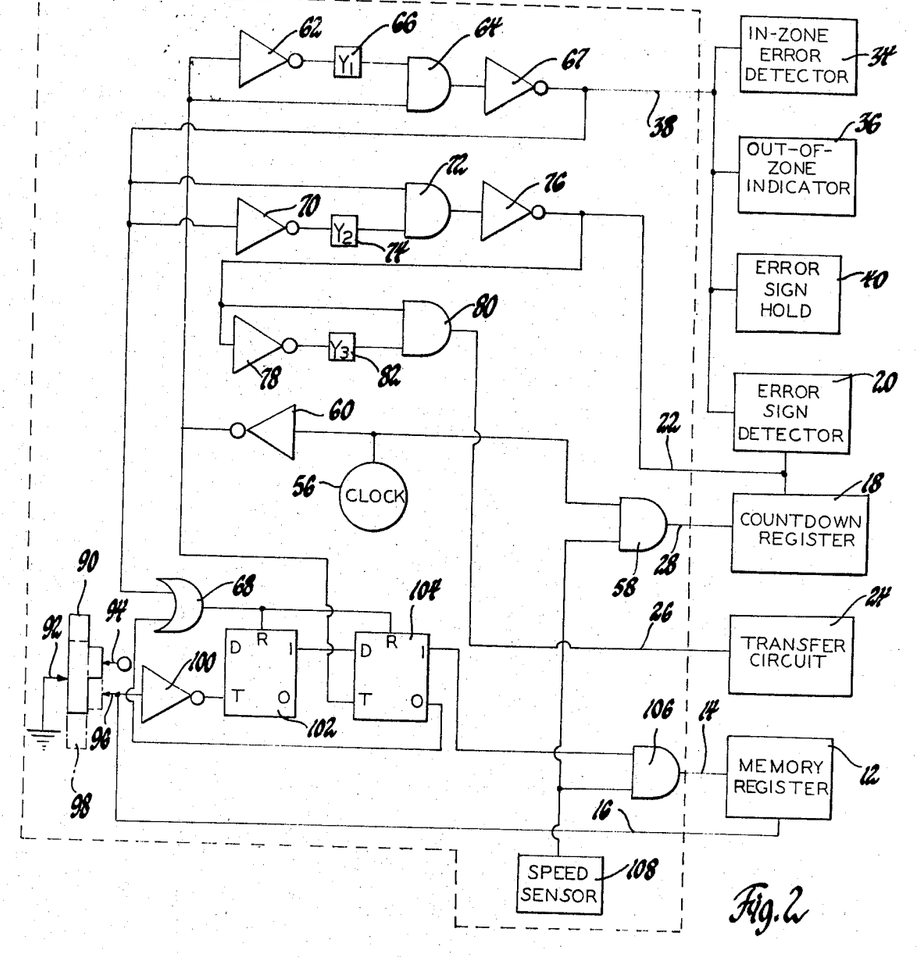
FIG. 2 is a schematic diagram of the input circuit of FIG. 1.

Referring to FIG. 2, the output of a clock 56 is supplied to an input of an AND gate 58 and an inverter 60. The output of the inverter 60 is supplied to the input of the inverter 62 and an input of an AND gate 64. The output of the inverter 62 is supplied to an input of the AND gate 64 through a time delay circuit 66 having a delay time $Y_1$. The output of the AND gate 64 is supplied to the input of an inverter 67. The output of the inverter 67 is supplied to the in-zone error detector 34, the out-of-zone indicator 36, the error sign hold 40 and the error sign detector 20 through the line 38. In addition, the output of the inverter 67 is supplied to an input of an OR gate 68, the input of an inverter 70, and an input of AND gate 72. The output of the inverter 70 is supplied an input of the AND gate 72 through a time delay circuit 74 having a delay time $Y_2$. The output of the AND gate 72 is supplied to the input of an inverter 76 whose output is supplied to the countdown register 18 and the error sign detector 20 through the line 22. In addition, the output of the inverter 76 is supplied to the input of an inverter 78 and an input of an AND gate 80. The output of the inverter 78 is supplied to an input of the AND gate 80 through a time delay 82 having a delay time $Y_3$. The output of the AND gate 80 is supplied to the transfer circuit 24 through the line 26.

Figure 3:
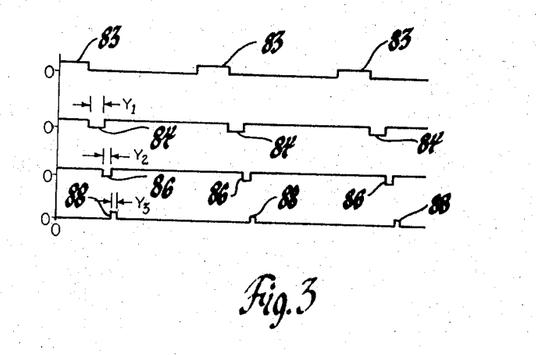
FIG. 3 is a graph of various outputs of the input circuit of FIG. 2.

Referring to FIGS. 2 and 3, the output of the clock 56 is a series of 1 bit pulses 83. The output of the inverter 67 is a series of 0 bit pulses 84 having a time duration $Y_1$ whose leading edge occurs simultaneously with the trailing edge of the 1 bit pulse 83 from the clock 56. The output of the inverter 76 is a series of 0 bit pulses 86 having a time duration $Y_2$ whose leading edge occurs simultaneously with the trailing edge of the 0 bit pulse 84. The output of the AND gate 80 is a series of 1 bit pulses 88 having a time duration $Y_3$ whose leading edge occurs simultaneously with the trailing edge of the 0 bit pulse 86. As can be seen, the pulses 84, 86 and 88 occur sequentially each time the pulse 83 occurs at the output of the clock 56.

A manually operable switch 90 engages a grounded stationary contact 92 and an open circuited stationary contact 94 when in the position shown and engages the stationary contact 92 and a stationary contact 96 when in the broken line position 98. The contact 96 is connected to the input of an inverter 100 and to the memory register 12 by the line 16. The output of the inverter 100 is supplied to the trigger input of a flip-flop 102 whose 1 output is supplied to the data input of a flip-flop 104. The output of the inverter 60 is supplied to the trigger input of the flip-flop 104. The 0 output of the flip-flop 104 is supplied to an input of the OR gate 68 whose output is connected to the reset inputs of the flip-flops 102 and 104. The 1 output of the flip-flop 104 is supplied to an input of an AND gate 106. The output of a speed sensor 108 is supplied to an input of the AND gate 58 and to an input of the AND gate 106. The speed sensor 108 may be, for example, a reed switch operated by a rotating magnet to generate a series of 1 bit pulses having a frequency corresponding to the speed of the vehicle. Such a speed pickup is well known and therefore will not be described in greater detail.

The flip-flops 102 and 104 are of the type in which the input to the data input is transferred to the 1 output when the input to the trigger input changes from a 1 bit to a 0 bit. The flip-flops 102 and 104, when reset, supply 0 bits at their 1 outputs and 1 bits at their 0 outputs. As can be seen, if the 0 output of the flip-flop 104 is a 0 bit, the flip-flop 104 will be reset by the output of the OR gate 68 upon the occurrence of the 0 bit pulse 84 at the output of the inverter 66. Thereafter, the output of the OR gate 68 remains a 1 bit since the input to the OR gate 68 from the 0 output of the flip-flop 104 is a 1 bit.

The input to the data lead of the flip-flop 102 is always a 1 bit since it is not grounded, and the input to the inverter 100 and the memory register 12 through the line 16 is a 1 bit unless the contact 96 is grounded through the switch 90 and the contact 92.

When the switch 90 is in the position as shown, the input to the inverter 100 and the input to the memory register 12 through line 16 is a 1 bit. Therefore, the trigger input of the flip-flop 102 from the inverter 100 is a 0 bit. When the switch 90 is moved to the broken line position 98, the input to the memory register 12 through the line 16 changes to a 0 bit since the contact 96 is grounded through the contact 92. This shift from a 1 bit to a 0 bit clears the memory register 12 so that the outputs of the binary stages within the memory register are all 0 bits. When it is desired to control the speed of the vehicle, it is necessary to supply to the memory register 12 a number of pulses which represents the desired speed of the vehicle. To accomplish this, the vehicle operator manually drives the vehicle to the desired speed and positions the contact 90 in the position as shown. The input to the inverter 100 changes from a 0 bit to a 1 bit to cause its output to change from a 1 bit to a 0 bit. This transition causes the 1 bit input at the data lead of the flip-flop 102 to be transferred to its 1 output. Upon the occurrence of the next leading edge of the 1 bit pulse 83 at the output of the clock 56, the output of the inverter 60 changes from a 1 bit to a 0 bit to trigger the flip-flop 104 and transfer the 1 bit input on its data lead to its 1 output.

This 1 bit will remain on the 1 output of the flip-flop 104 until the trailing edge of the 1 bit pulse 83 occurs at the output of the clock 56. Simultaneously with the trailing edge of the pulse 83, the leading edge of the 0 bit pulse 84 at the output of the inverter 67 causes the output of the OR gate 68 to change from a 1 bit to a 0 bit since the 0 output of the flip-flop 104 is then a 0 bit. This transition from a 1 bit to a 0 bit resets the flip-flops 102 and 104 to cause the respective 1 outputs to change to a 0 bit. As can be seen, the 1 bit on the 1 output of the flip-flop 104 has a time duration equal to the time duration of the 1 bit pulse 83 at the output of the clock 56. During this time duration, the output of the speed sensor 108, which is a series of 1 bit pulses having a frequency corresponding to the speed of the vehicle, periodically enables the AND gate 106 to supply a series of 1 bit pulses corresponding to the output of the speed sensor 108 to the memory register 12 through the line 14. The total number of pulses supplied to the memory register through the line 14 represents the desired speed of the vehicle. These pulses step the memory register 12 so as to generate therein a binary number which represents the desired speed of the vehicle. As can be seen, the AND gate 106 cannot be enabled again to supply 1 bit pulses to the memory register 12 until such time that the switch 90 is placed in the broken line position 98 to clear the memory register 12 through the line 16 and again placed in the position as shown. Therefore, for the time duration that the switch 90 remains in the position shown, the memory register 12 stores the binary number generated therein.

The sequence which occurs subsequent to the stepping of the memory register 12 will be discussed beginning with the 0 bit pulse 86 at the output of the inverter 76. The 0 bit pulse 86 is supplied to the countdown register 18 and the error sign detector 20 through the line 22. This pulse clears the countdown register 18 and resets the error sign detector 20. The 1 bit pulse 88 is then supplied by the AND gate 80 to the transfer circuit 24 through the line 26 to enable the transfer circuit 24 to transfer the binary number stored within the memory register 12 to the countdown register 18. As previously indicated, in order to determine the error in the speed of the vehicle, it is necessary to subtract from the binary number in the countdown register 18 a number which represents the actual speed of the vehicle. This number is attained by supplying to the countdown register 18 a series of pulses having a frequency corresponding to the actual speed of the vehicle for a specified duration of time equal to the duration of time that the series of 1 bit pulses was supplied to the memory register 12 through the line 14. As previously indicated, this duration of time is equal to the time duration of the 1 bit pulse 83 at the output of the clock 56. Following the 1 bit pulse 88, the clock 56 supplies the 1 bit pulse 83 to the AND gate 58 so that the AND gate 58 is periodically enabled by the 1 bit pulse output of the speed sensor 108. The AND gate 58 is periodically enabled by the output of the speed sensor 108 only during the time duration of the 1 bit pulse 83 at the output of the clock 56. Therefore, the number of 1 bit pulses supplied to the countdown register 18 through the line 28 represents the actual speed of the vehicle. These pulses step the countdown register 18 to subtract from the binary number transferred from the memory register 12 the number which represents the actual speed of the vehicle. The binary number remaining within the countdown register 12 at the end of the 1 bit pulse 83 represents the error in speed of the vehicle. Following the 1 bit pulse 83, the inverter 67 supplies the 0 bit pulse 84 through the line 38 to enable the error sign detector 20, the error sign hold 40, the out-of-zone indicator 36 and the in-zone error detector 34 to store the information detected during the same time duration of the 1 bit pulse 83.

Figure 4:
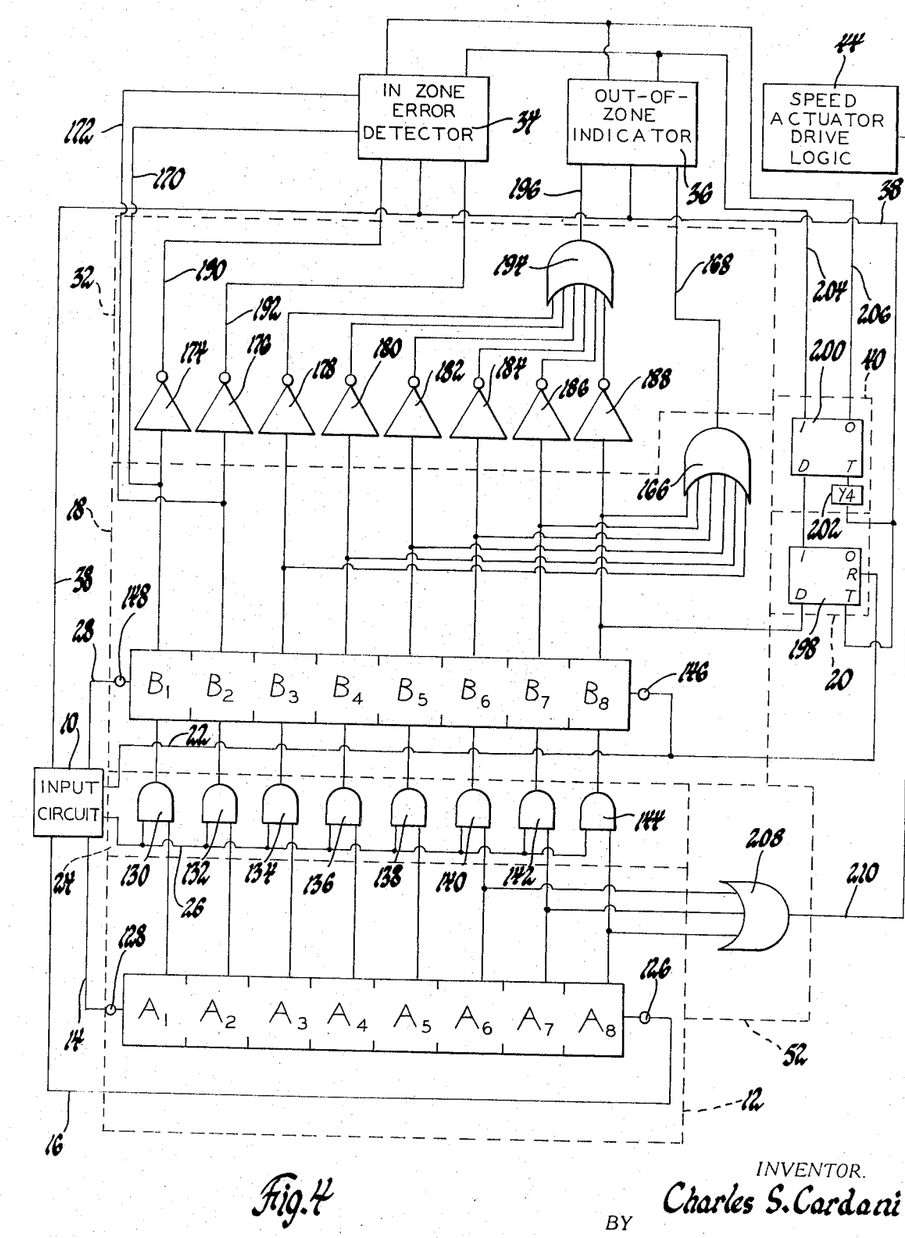
FIG. 4 is a schematic diagram of the memory register, transfer circuit, countdown register, low speed inhibit, error sign detector, error sign hold, inverter, and out-of-zone indicator of FIG. 1.

Referring to FIG. 4, the memory register 12 is comprised of the binary stages $A_1$ through $A_8$ ranging from low to high order, respectively. The binary stages $A_1$ through $A_8$ supply outputs in the form of 1 bits or 0 bits on their respective output lines. The lines 16 and 14 from the input circuit 10 are connected to the clearing terminal 126 and the input terminal 128 respectively. ectively. When the input to the terminal 126 changes from a 1 bit to a 0 bit, the memory register 12 is cleared and the outputs of the binary stages $A_1$ through $A_8$ are all 0 bits. A series of 1 bit pulses appearing at the input terminal 128 are counted binary from by the memory register 12 with the net count appearing as 1 bits and 0 bits at the outputs of the binary stages $A_1$ through $A_8$.

The transfer circuit 24 is comprised of the AND gates 130, 132, 134, 136, 138, 140, 142 and 144 each corresponding to and receiving an input from a respective binary stage $A_1$ through $A_8$ of the memory register 12 and an input from the input circuit 10 through the line 26.

The countdown register 18 is comprised of the binary stages $B_1$ through $B_8$ ranging from low to high order, respectively. The lines 22 and 28 from the input circuit 10 are connected to the clearing terminal 146 and the input terminal 148 respectively. The outputs of the binary stages $B_1$ through $B_8$ take the form of 0 or 1 bits appearing on their respective output lines. When the input to the terminal 146 through the line 22 changes from a 1 bit to a 0 bit, the outputs of the binary stages $B_1$ through $B_8$ are all cleared to 0 bits. Each of the binary stages $B_1$ through $B_8$ receives an input from an AND gate 130, 132, 134, 136, 138, 140, 142 and 144, respectively. If a 1 bit pulse is supplied to the transfer circuit 24 through the line 26, the 1 bits appearing on the outputs of the binary stages $A_1$ through $A_8$ are transferred through the respective AND gates 130, 132, 134, 136, 138, 140, 142 and 144 to the respective binary stages $B_1$ through $B_8$ in the countdown register 18. The binary number represented by the 1 bits and 0 bits at the outputs of the binary stages $B_1$ through $B_8$ is then the same as the binary number stored in the memory register 12. Thereafter, 1 bit pulses supplied to the input terminal 148 through the line 28 subtract from the binary number within the countdown register 18. As can be seen, if the binary number transferred from the memory register 12 into the countdown register 18 is a number representing the desired speed of the vehicle, and the number of pulses supplied to the input terminal 148 through the line 28 is a number which represents the actual speed of a vehicle, the binary number remaining within the countdown register 18 represents the error in the speed of the vehicle.

Each output of the higher ordered binary stages $B_3$ through $B_8$ is supplied to an input of an OR gate 166 whose output is supplied to the out-of-zone indicator 36 through a line 168. The output of the lower ordered binary stages $B_1$ and $B_2$ are supplied to the in-zone error detector 34 through the lines 170 and 172, respectively. In addition, the output of each binary stage $B_1$ through $B_8$ is supplied to an inverter 174, 176, 178, 180, 182, 184, 186 and 188, respectively, in the inverter array 32. The output of the inverters 174 and 176 are supplied to the in-zone error detector 34 through the lines 190 and 192, respectively. The outputs of the inverters 178, 180, 182, 184, 186 and 188 are supplied to an OR gate 194 whose output is supplied to the out-of-zone indicator 36 through a line 196. Since the in-zone error detector 34 receives information from the two lowest ordered binary stages $B_1$ and $B_2$ in the countdown register 18 and the corresponding inverters 174 and 176 in the inverter array 32, in-zone as previously defined is the speed error represented by the difference of ±3 between the number representing the actual vehicle speed and the number representing the desired vehicle speed.

The error sign detector 20 is comprised of a flip-flop 198 having its data input connected to the higher ordered binary stage $B_8$, its reset input connected to the input circuit 10 by the line 22, its trigger input connected to the input circuit 10 by the line 38 and its 1 output connected to the data input of a flip-flop 200 in the error sign hold 40.

The line 38 from the input circuit 10 is also connected to the trigger input of the flip-flop 200 through a time delay circuit 202 having a delay time $Y_4$. The 1 output of the flip-flop 200 is connected to the in-zone error detector 34 and the out-of-zone indicator 36 through a line 204 and its 0 output is connected to the in-zone error detector 34 and the out-of-zone indicator 36 through a line 206.

The low speed inhibit 52 is comprised of an OR gate 208 having an input from each of the three highest ordered binary stages $A_6$ through $A_8$ in the memory register 12. The OR gate 208 will supply a 1 bit output when the output of any one of the binary stages $A_6$ through $A_8$ is a 1 bit. Therefore, as can be seen, a 1 bit will appear at the output of the OR gate 208 when $2^5$ pulses are supplied to the input terminal 128 through the input line 14. This number represents the minimum speed at which the vehicle can be controlled. The output of the OR gate 208 is supplied to the speed actuator drive logic 44 through a line 210.

In operation, the series of pulses representing the desired speed of the vehicle is supplied to the input terminal 128 of the memory register 12 through the line 14 to generate therein a binary number representing the desired speed of a vehicle. If the speed of the vehicle is greater than the minimum speed at which the vehicle can be controlled, at least one of the inputs to the OR gate 208 from the binary stages $A_6$ through $A_8$ will be a 1 bit. The OR gate 208 will therefore supply a 1 bit to the speed actuator drive logic 44 through the line 210. If the vehicle is below the minimum speed, all the inputs to the OR gate 208 will be 0 bits and the OR gate 208 will supply a 0 bit to the speed actuator drive logic 44 through the line 210. As previously described, the countdown register 18 is cleared and the error sign detector 20 is reset by the 0 bit pulse 86 supplied through the line 22. The 1 bit pulse 88 is then supplied to the transfer circuit 24 through the line 26 to transfer the binary number within the memory register 12 to the countdown register 18. Thereafter the number of 1 bits representing the actual speed of the vehicle is supplied to the input terminal 148 of the countdown register 18 through the line 28 to subtract from the number representing the desired speed of the vehicle a number which represents the actual speed of the vehicle.

The actual speed of the vehicle can take one of the following forms: underspeed out-of-zone, underspeed in-zone, equal to the desired speed, overspeed in-zone, or overspeed out-of-zone. Each one of the aforementioned conditions will be described respectively.

When the actual speed of the vehicle is underspeed out-of-zone, the output of at least one of the binary stages $B_3$ through $B_8$ is a 1 bit. Therefore, since one of the inputs to the OR gate 166 is a 1 bit, the output is a 1 bit supplied to the out-of-zone indicator 36 through the line 168. As the output of the binary stage $B_8$ represents the highest ordered binary stage within the countdown register 18, its output is 0 bit for all foreseeable circumstances when the vehicle is underspeed out-of-zone. Therefore, a 0 bit is supplied to the data input of the flip-flop 198 in the error sign detector 20.

When the speed of the vehicle is underspeed in-zone, the output of the binary stages $B_3$ through $B_8$ are all 0 bits and the vehicle error is represented by the outputs of the binary stages $B_1$ and $B_2$. Since the inputs to the OR gate 166 from the binary stages $B_3$ through $B_8$ are all 0 bits, the output of the OR gate 166 is a 0 bit supplied to the out-of-zone indicator 36 through the line 168. In addition, the inputs to the OR gate 194 from the inverters 178, 180, 182, 184, 186 and 188 are all 1 bits. Therefore, the output of the OR gate 194 is a 1 bit supplied to the out-of-zone indicator 36 through the line 196. The output of the binary stage $B_8$ is a 0 bit supplied to the data input of the flip-flop 198 in the error sign detector 20.

When the vehicle speed error is three counts underspeed, the outputs of the binary stages $B_1$ and $B_2$ are 1 bits which are supplied to the in-zone error detector 34 through the lines 170 and 172 respectively and the outputs of the inverters 174 and 176 are 0 bits which are supplied to the in-zone error detector 34 through the lines 190 and 192 respectively.

When the vehicle speed error is two counts underspeed, the outputs of the binary stage $B_1$ and the inverter 176 are 0 bits supplied to the in-zone error detector 34 through the lines 170 and 192 respectively and the outputs of the binary stage $B_2$ and the inverter 174 are 1 bits supplied to the in-zone error detector 34 through the lines 172 and 190 respectively.

When the vehicle speed error is one count underspeed, the outputs of the binary stage $B_1$ and the inverter 176 are 1 bits which are supplied to the in-zone error detector 34 through the lines 170 and 192 respectively and the outputs of the binary stage $B_2$ and the inverter 174 are 0 bits which are supplied to the in-zone error detector 34 through the lines 172 and 190 respectively.

When the actual speed of the vehicle is equal to the desired speed of the vehicle the outputs of all the binary stages $B_1$ through $B_8$ in the countdown register 18 are all 0 bits. Therefore, the output of the OR gate 166 is a 0 bit which is supplied to the out-of-zone indicator 36 through the line 168, the inputs to the in-zone error detector 34 from the binary stages $B_1$ and $B_2$ through the lines 170 and 172 respectively are 0 bits, the inputs to the in-zone error detector 34 from the inverters 174 and 176 through the lines 190 and 192 respectively are 1 bits, and the outputs of the inverters 178, 180, 182, 184, 186 and 188 are all 1 bits which are supplied to the inputs of the OR gate 194 whose output is a 1 bit supplied to the out-of-zone indicator 36 through the line 196. The input to the data lead of the flip-flop 198 from the binary stage $B_8$ is also a 0 bit.

When the speed of the vehicle is overspeed in zone, the output of the binary stages $B_3$ through $B_8$ in the countdown register 18 are all 1 bits since the first 1 bit pulse in excess of the number which was transferred to the countdown register 18 from the memory register 12 shifts all the outputs of the binary stages $B_1$ through $B_8$ from a 0 bit to a 1 bit. Therefore, the output of the binary stage $B_8$ is a 1 bit which is supplied to the data input of the flip-flop 198. In addition, the inputs to the OR gate 166 from the binary stages $B_3$ through $B_8$ are 1 bits. The output of the OR gate 166 is therefore a 1 bit which is supplied to the out-of-zone indicator 36 through the line 168. The respective outputs of the inverters 178, 180, 182, 184, 186 and 188 are all 0 bits which are supplied to the OR gate 194 whose output is therefore a 0 bit which is supplied to the out-of-zone indicator 36 through the line 196.

When the vehicle speed error is one count overspeed, the outputs of the binary stages $B_1$ and $B_2$ are 1 bits which are supplied to the in-zone error detector through the lines 170 and 172 respectively and the outputs of the inverters 174 and 176 are 0 bits which are supplied to the in-zone error detector 34 through the lines 190 and 192 respectively.

When the vehicle speed error is two counts overspeed, the outputs of the binary stage $B_1$ and the inverter 176 are both 0 bits which are supplied to the in-zone error detector 34 through the lines 170 and 192 respectively and the outputs of the binary stage $B_2$ and the inverter 174 are both 1 bits which are supplied to the in-zone error detector 34 through the lines 172 and 190 respectively.

When the vehicle speed error is three counts overspeed, the outputs of the binary stage $B_2$ and the inverter 174 are both 0 bits which are supplied to the in-zone error detector 34 through the lines 172 and 190 respectively and the outputs of the binary stage $B_1$ and the inverter 176 are both 1 bits which are supplied to the in-zone error detector 34 through the lines 170 and 192 respectively.

When the speed of the vehicle is overspeed out-of-zone, the output of the highest ordered binary stage $B_8$ for all foreseeable circumstances is a 1 bit which is supplied to the data input of the flip-flop 198. Also when overspeed out-of-zone, the output of at least one of the inverters 178, 180, 182, 184, 186 and 188 is a 1 bit which is supplied to the OR gate 194 whose output is therefore a 1 bit which is supplied to the out-of-zone indicator 36 through the line 196 except in one isolated instance. This instance is when the speed of the vehicle is four counts above the desired speed. In this instance, the outputs of the inverters 178, 180, 182, 184, 186 and 188 are all 0 bits which are supplied to the OR gate 194 whose output is therefore a 0 bit which is supplied to the out-of-zone indicator 36 through the line 196. In addition, in this instance, the output of the binary stages $B_1$ and $B_2$ are 0 bits which are supplied to the in-zone error detector 34 through the lines 170 and 172 respectively and the outputs of the inverters 174 and 176 are 1 bits which are supplied to the in-zone error detector 34 through the lines 190 and 192 respectively.

Upon completion of the 1 bit pulse 83 from the clock 56 in FIG. 2, the inputs to the in-zone error detector 34, the out-of-zone indicator 36, and the error sign detector 20 from the countdown register 18 and the inverter 32 correspond to the vehicle speed condition as described. The input circuit 10 then supplies the 0 bit pulse 84 to enable the in-zone error detector 34, the out-of-zone indicator 36 and the error sign hold 40 to store their respective inputs until a new speed error is determined in the next cycle.

The flip-flop 198 in the error sign detector 20 is triggered by the 0 bit pulse 84 to transfer the input to its data input to its 1 output. After a delay time $Y_4$ as determined by the time delay circuit 202, the flip-flop 200 in the error sign hold 40 is triggered to transfer to its 1 output the input to its data input from the flip-flop 198. Therefore, the output of the binary stage $B_8$ is stored by the error sign hold 40 and is supplied along with its inverse to the in-zone error detector 34 and the out-of-zone indicator 36 through the lines 204 and 206 respectively. These outputs are then utilized to select either the outputs of the countdown register 18 or the inverter array 32 to determine the underspeed condition respectively.

Figure 5:
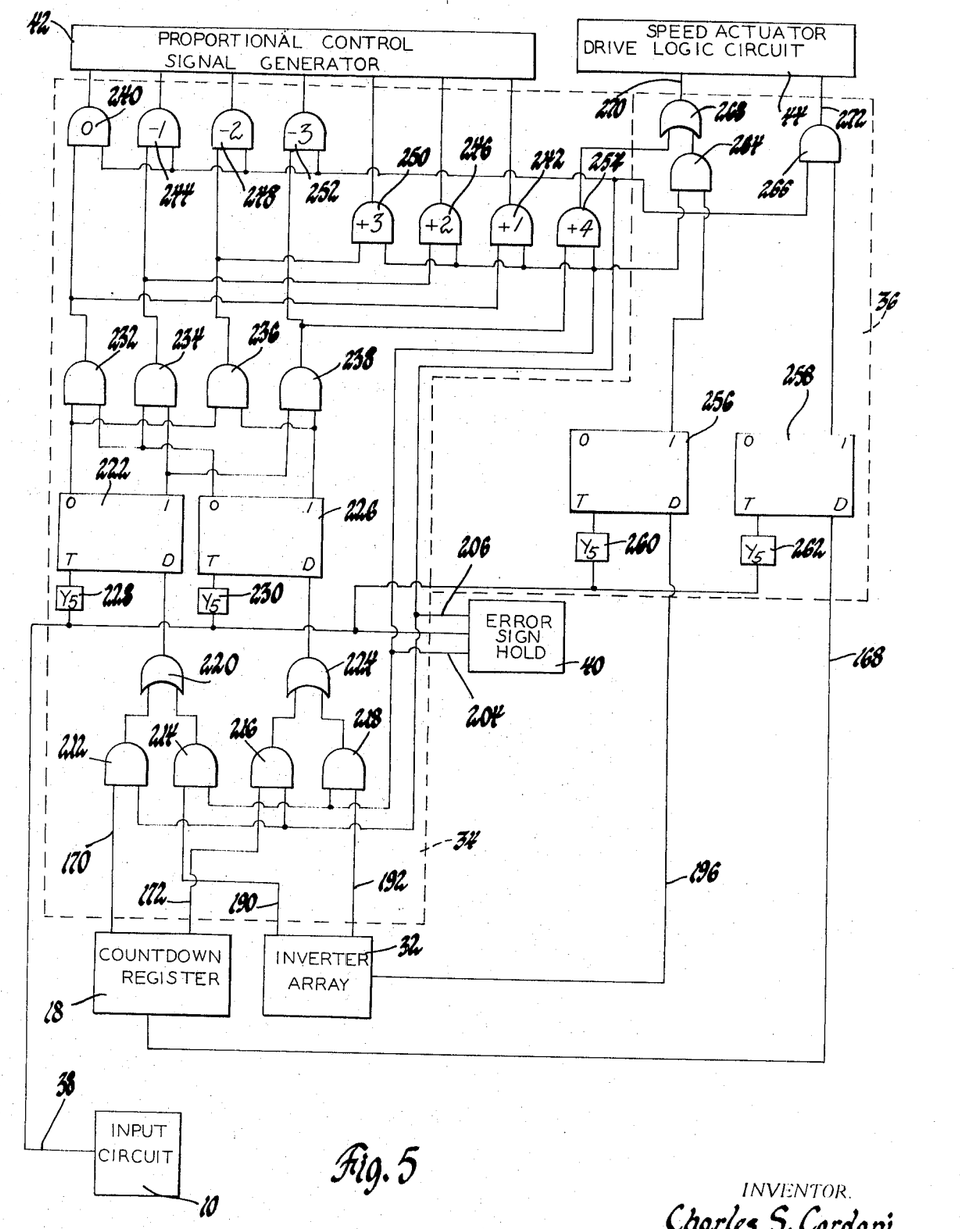
FIG. 5 is a schematic diagram of the in-zone error detector of FIG. 1.

Referring to FIG. 5, the in-zone error detector 34 is comprised of an AND gate 212 which receives an input from the countdown register 18 through the line 170 and another input from the error sign hold 40 through the line 206, an AND gate 214 which receives an input from the inverter array 32 through the line 190 and another input from the error sign hold 40 through the line 204, an AND gate 216 which receives an input from the countdown register 18 through the line 172 and another input from the error sign hold 40 through the line 206, and an AND gate 218 which receives an input from the inverter array 32 through the line 192 and another input from the error sign hold 40 through the line 204. The outputs of the AND gates 212 and 214 are connected to respective inputs of an OR gate 220 whose output is supplied to the data input of a flip-flop 222. The outputs of the AND gates 216 and 218 are respectively connected to inputs of an OR gate 224 whose output is supplied to the data input of a flip-flop 226. The trigger inputs of the flip-flops 222 and 226 receive an input from the input circuit 10 through the line 38 and the time delay circuits 228 and 230, respectively. The time delay circuits 228 and 230 each have a delay time $Y_5$ which is greater than the delay time $Y_4$ as previously described with reference to FIG. 4. This is to insure that the outputs of the error sign hold 40 through the lines 204 and 206 occur prior to the triggering of the flip-flops 222 and 226. An AND gate 232 receives an input from the 0 output of the flip-flop 222 and another input from the 0 output of the flip-flop 226. An AND gate 234 receives an input from the 0 output of the flip-flop 226 and another input from the 1 output of the flip-flop 222. An AND gate 236 receives an input from the 0 output of the flip-flop 222 and another input from the 1 output of the flip-flop 226. An AND gate 238 receives an input from the 1 output of the flip-flop 222 and another input from the 1 output of the flip-flop 226. The output of the AND gate 232 is connected to an input of an AND gate 240 and to an input of an AND gate 242. The output of the AND gate 234 is connected to an input of an AND gate 244 and to an input of an AND gate 246. The output of the AND gate 236 is connected to an input of an AND gate 248 and to an input of an AND gate 250. The output of the AND gate 238 is connected to an input of an AND gate 252 and to an input of an AND gate 254. Each of the AND gates 240, 244, 248, and 252 receives an input from the error sign hold 40 through the line 206. Each of the AND gates 242, 246, 250 and 254 receives an input from the error sing hold 40 through the line 204. The outputs of the AND gate 240, 242, 246, 248, 250 and 252 are supplied to the proportional control signal generator 42.

The out-of-zone indicator 36 includes a flip-flop 256 and a flip-flop 258 each of which receives a trigger input from the input circuit 10 through the line 38 and the respective time delay circuits 260 and 262 each having a delay time $Y_5$ which is equal to the delay of the time delay circuits 228 and 230 in the in-zone error detector 34. The data input of the flip-flop 256 receives an input from the inverter array 32 through the line 196. The data input of the flip-flop 258 receives an input from the countdown register 18 through the line 168. The 1 output of the flip-flop 256 is supplied to an AND gate 264 which receives another input from the error sign hold 40 through the line 204. The 1 output of the flip-flop 258 is supplied to an AND gate 266 which receives another input from the error sign hold 40 through the line 206. The output of the AND gate 264 is supplied to an input of an OR gate 268 which receives another input from the AND gate 254 in the in-zone error detector 34. The outputs of the OR gate 268 and the AND gate 266 are supplied to the speed actuator drive logic 44 through a line 270 and a line 272 respectively.

When the vehicle is underspeed out-of-zone, the countdown register 18 supplies a 1 bit to the data input of the flip-flop 258 through the line 168. In addition, the error sign hold 40 supplies a 1 bit to the AND gate 266 through the line 206 and supplies a 0 bit to the AND gate 254 and to the AND gate 264 through the line 204. Upon the completion of the stepping of the countdown register 18, the input circuit 10 supplies the 0 bit pulse 84 through the line 38 to trigger the flip-flop 258 to transfer the 1 bit at its data input to the 1 output. The outputs of the AND gates 254 and 264 are both 0 bits as a result of the 0 bits supplied to their inputs through the line 204. Therefore, the output of the OR gate 268 is a 0 bit which is supplied to the speed actuator drive logic 44 through the line 270. Since both inputs to the AND gate 266 are 1 bits, its output is a 1 bit which is supplied to the speed actuator drive logic 44 through the line 272.

When the vehicle speed is underspeed in-zone, the countdown register 18 supplies a 0 bit to the data input of the flip-flop 258 through the line 168. The error sign hold 40 supplies a 0 bit to the AND gates 242, 246, 250 and 254 in the in-zone error detector 34 to prevent them from being enabled to supply 1 bits to the proportional control signal generator 42 and to the AND gate 264 in the out-of-zone indicator 36 through the line 204. In addition, the error sign hold 40 supplies a 1 bit to the AND gates 240, 244, 248 and 252 in the in-zone error detector 34 and to the AND gate 266 in the out-of-zone indicator 36 through the line 206. The 0 bit pulse 84 supplied to the flip-flop 258 through the line 38 and the time delay circuit 262 triggers the flip-flop 258 to transfer the 0 bit at its data input to its 1 output. Therefore, the AND gate 266 supplies a 0 bit to the speed actuator drive logic 44 through the line 272. The outputs of the AND gates 254 and 264 are 0 bits which are supplied to the OR gate 268 which supplies a 0 bit to speed actuator drive logic 44 through the line 270.

When the vehicle speed error is three counts underspeed, the AND gate 212 receives a 1 bit through the line 170 and a 1 bit through the line 206 and the AND gate 214 receives a 0 bit input through the line 204. The AND gate 212 is therefore enabled to supply a 1 bit to the OR gate 220 which supplies a 1 bit to the data input of the flip-flop 222. The AND gate 216 receives a 1 bit through the line 172 and a 1 bit through the line 206 and the AND gate 218 receives a 0 bit input through the line 204. The AND gate 216 is therefore enabled to supply a 1 bit to the OR gate 224 which supplies a 1 bit to the data input of the flip-flop 226. Upon the occurrence of the 0 bit pulse 84 through the line 38 and the time delay circuits 228 and 230, the flip-flop 222 and 226 are triggered to transfer the 1 bits at their respective data inputs to their respective 1 outputs. The AND gate 238 is therefore enabled to supply a 1 bit to the AND gate 252 which is enabled to supply a 1 bit to the proportional control signal generator 42.

When the vehicle speed is two counts underspeed, the AND gate 212 receives a 0 bit input through the line 170 and the AND gate 214 receives a 0 bit input through the line 204. Therefore, the outputs of the AND gates 212 and 214 are 0 bits supplied to the OR gate 220 whose output is a 0 bit supplied to the data input of the flip-flop 222. The AND gate 216 receives a 1 bit through the line 172 and a 1 bit through the line 206 and the ANd gate 218 receives a 0 bit input through the line 204. The AND gate 216 is therefore enabled to supply a 1 bit to the OR gate 224 which supplies a 1 bit to the data input of the flip-flop 226. Upon the occurrence of the 0 bit pulse 84 through the line 38 and the time delay circuits 228 and 230 the flip-flops 222 and 226 are triggered to transfer the 0 bit at the data input of the flip-flop 222 to its 1 output and the 1 bit at the data input of the flip-flop 226 to its 1 output. The AND gate 236 therefore is enabled to supply a 1 bit to the AND gate 248 which is enabled to supply a 1 bit to the proportional control signal generator 42.

When the vehicle speed error is one count underspeed, the AND gate 212 receives a 1 bit input through the line 170 and a 1 bit input through the line 206 and the AND gate 214 receives a 0 bit input through the line 204. The AND gate 212 is therefore enabled to supply a 1 bit to the OR gate 220 which supplies a 1 bit to the data input of the flip-flop 222. The AND gate 216 receives a 0 bit input through the line 172 and the AND gate 218 receives a 0 bit input through the line 204. The outputs of the AND gates 216 and 218 are therefore 0 bits supplied to the OR gate 224 whose output is a 0 bit supplied to the data input of the flip-flop 226. Upon the occurrence of the 0 bit pulse 84 supplied through the line 38 and the time delay circuits 228 and 230, the flip-flops 222 and 226 are triggered to transfer the 1 bit at the data input of the flip-flop 222 to its 1 output and to transfer the 0 bit at the data input of the flip-flop 226 to its 1 output. The AND gate 234 is therefore enabled to supply a 1 bit to the AND gate 244 which is enabled to supply a 1 bit to the proportional control signal generator 42.

When the vehicle speed is equal to the desired speed, the inputs to the speed actuator drive logic through the lines 270 and 272 remain the same since the inputs to the flip-flops 256 and 258 through the lines 196 and 168 respectively remain unchanged. The AND gate 212 receives a 0 bit through the line 170 and the AND gate 214 receives a 0 bit through the line 204. The outputs of the AND gates 212 and 214 are therefore 0 bits which are supplied to the OR gate 220 which supplies a 0 bit to the data input of the flip-flop 222. The AND gate 16 receives a 0 bit input through the line 172 and the AND gate 218 receives a 0 bit input through the line 204. The output of the AND gates 216 and 218 are therefore 0 bits which are supplied to the OR gate 224 which supplies a 0 bit to the data input of the flip-flop 226. Upon the occurrence of the 0 bit pulse 84 through the line 38 and the time delay circuits 228 and 230, the flip-flops 222 and 226 are triggered to transfer the 0 bits at their respective data inputs to their respective 1 outputs. The AND gate 232 is therefore enabled to supply a 1 bit to the AND gate 240 which is enabled to supply a 1 bit to the proportional control signal generator 42.

When the speed of the vehicle is overspeed in-zone, the countdown register 18 supplies a 1 bit to the data input of the flip-flop 258 through the line 168 and the inverter 32 supplies a 0 bit to the data input of the flip-flop 256 through the line 196. The 0 bit pulse 84 supplied to the trigger inputs of the flip-flops 256 and 258 through the line 38 and the time delay circuits 260 and 262 triggers the flip-flops 256 and 258 to transfer the 1 bit at the data input of the flip-flop 258 to its 1 output and to transfer the 0 bit at the data input of the flip-flop 256 to its 1 output. The error sign hold 40 supplies a 0 bit through the line 206 to the AND gates 240, 244, 248, and 252 in the in-zone error detector 34 to prevent them from being enabled to supply a 1 bit to the proportional control signal generator 42. In addition, the 0 bit is supplied through the line 206 to the AND gate 266 in the out-of-zone indicator 36. Therefore, the output of the AND gate 266 is a 0 bit which is supplied to the speed actuator drive logic 44 through the line 272. The error sign hold 40 supplies a 1 bit through the line 204 to the and gates 242, 246, 250 and 254. Since the input to the AND gate 254 from the AND gate 238 is a 0 bit, the output of the AND gate 254 is a 0 bit which is supplied to the OR gate 268. The input to the AND gate 264 from the 1 output of the flip-flop 256 is a 0 bit. Therefore, the AND gate 264 supplies a 0 bit to the OR gate 268 which supplies a 0 bit to the speed actuator drive logic 44 through the line 270.

When the vehicle speed is one count overspeed, the AND gate 212 receives a 0 bit input through the line 206, the AND gate 214 receives a 0 bit input through the line 190, the AND gate 216 receives a 0 bit input through the line 206, and the AND gate 218 receives a 0 bit through the line 192. Therefore, the outputs of the AND gates 212, 214, 216 and 218 are 0 bits supplied to the respective OR gates 220 and 224 whose outputs are 0 bits supplied to the data inputs of the flip-flops 222 and 226 respectively. Upon the occurrence of the 0 bit pulse 84 through the line 38 and the time delay circuits 228 and 230, the flip-flops 222 and 226 are triggered to transfer the 0 bit at the data input of the flip-flop 222 to its 1 output and the 0 bit at the data input of the flip-flop 226 to its 1 output. The AND gate 232 is therefore enabled to supply a 1 bit to the AND gate 242 which is enabled to supply a 1 bit to the proportional control signal generator 42.

When the vehicle speed is two counts overspeed, the AND gate 212 receives a 0 bit input through the line 170 and the AND gate 214 receives a 1 bit input through the line 190 and a 1 bit input through the line 204. The AND gate 214 is therefore enabled to supply a 1 bit to the OR gate 220 which supplies a 1 bit to the data input of the flip-flop 222. The AND gate 216 receives a 0 bit input through the line 206 and the AND gate 218 receives a 0 bit input through the line 192. Therefore, the outputs of the AND gates 216 and 218 are 0 bits supplied to the OR gate 224 whose output is a 0 bit supplied to the data input of the flip-flop 226. Upon the occurrence of the 0 bit pulse 84 through the line 38 and the time delay circuits 228 and 230, the flip-flops 222 and 226 are triggered to transfer the 1 bit at the data input of the flip-flop 222 to its 1 output and the 0 bit at the data input of the flip-flop 226 to its 1 output. The AND gate 234 is therefore enabled to supply a 1 bit to the AND gate 246 which is enabled to supply a 1 bit to the proportional control signal generator 42.

When the vehicle speed is three counts overspeed, the AND gate 212 receives a 0 bit input through the line 206 and the AND gate 214 receives a 0 bit through the line 190. The outputs of the AND gates 212 and 214 are therefore 0 bits supplied to the OR gate 220 whose output is a 0 bit supplied to the data input of the flip-flop 222. The AND gate 216 receives a 0 bit input through the line 206 and the AND gate 218 receives a 1 bit through the line 204 and a 1 bit through the line 192. The AND gate 218 is therefore enabled to supply a 1 bit to the OR gate 224 which supplies a 1 bit to the data input of the flip-flop 226. Upon the occurrence of the 0 bit pulse 84 through the line 38 and the time delay circuits 228 and 230, the flip-flops 222 and 226 are respectively triggered to transfer the 0 bit at the data input of the flip-flop 222 to its 1 output and the 1 bit at the input of the data lead of the flip-flop 226 to its 1 output. The AND gate 236 is therefore enabled to supply a 1 bit to the AND gate 250 which is enabled to supply a 1 bit to the proportional control signal generator 42.

When the speed of the vehicle is overspeed out-of-zone and in the special instance when the number remaining in the countdown register 18 represents four counts overspeed, the inputs to the AND gates 264 and 266 in the out-of-zone indicator 36 remain the same as indicated in the description when the vehicle speed was overspeed in-zone. Therefore, the input to the speed actuator drive logic 44 through the line 272 remains a 0 bit and the input to the OR gate 268 from the AND gate 264 also remains a 0 bit. The AND gate 212 receives a 0 bit input through the line 170 and the AND gate 214 receives a 1 bit input through the line 190 and a 1 bit input through the line 204. The AND gate 214 is therefore enabled to supply a 1 bit to the OR gate 220 which supplies a 1 bit to the data input of the flip-flop 222. The AND gate 216 receives a 0 bit input through the line 172 and the AND gate 218 receives a 1 bit input through the line 204 and a 1 bit input through the line 192. The AND gate 218 is therefore enabled to supply a 1 bit to the OR gate 224 which supplies a 1 bit to the data input of the flip-flop 226. Upon the occurrence of the 0 bit pulse 84 through the line 38 and the time delay circuits 228 and 230 the flip-flops 222 and 226 are triggered to transfer the 1 bit at the data input of the flip-flop 222 to its 1 output and the 1 bit at the data input of the flip-flop 226 to its 1 output. The AND gate 238 is therefore enabled to supply a 1 bit to the AND gate 254 which is enabled to supply a 1 bit to the OR gate 268. The OR gate 268 is then enabled to supply a 1 bit to the speed actuator drive logic 44 through the line 270.

When the vehicle speed is greater than four counts overspeed, the inverter array 32 supplies a 1 bit to the data input of the flip-flop 256 through the line 196. The error sign hold 40 supplies a 0 bit to the AND gate 266 through the line 206 and a 1 bit to the input of the AND gate 264 through the line 204. Upon the occurrence of the 0 bit pulse 84 through the line 38 and the time delay circuit 260, the flip-flop 256 is triggered to transfer the 1 bit at the data input to its 1 output. The AND gate 264 is therefore enabled to supply a 1 bit to the OR gate 268 which in turn supplies a 1 bit to the speed actuator drive logic 44 through the line 270. The AND gate 266 which receives a 0 bit input through the line 206 supplies a 0 bit to the speed actuator drive logic 44 through the line 272.

From the foregoing, it can be seen that the information stored in the in-zone error detector 34 and the out-of-zone indicator 36 is stored for the period of one cycle which is initiated by the 1 bit pulse 83 at the output of the clock 56 in FIG. 2. This information is utilized to control the speed of the vehicle in a manner responsive to the magnitude of the speed error sensed.

Figure 6:
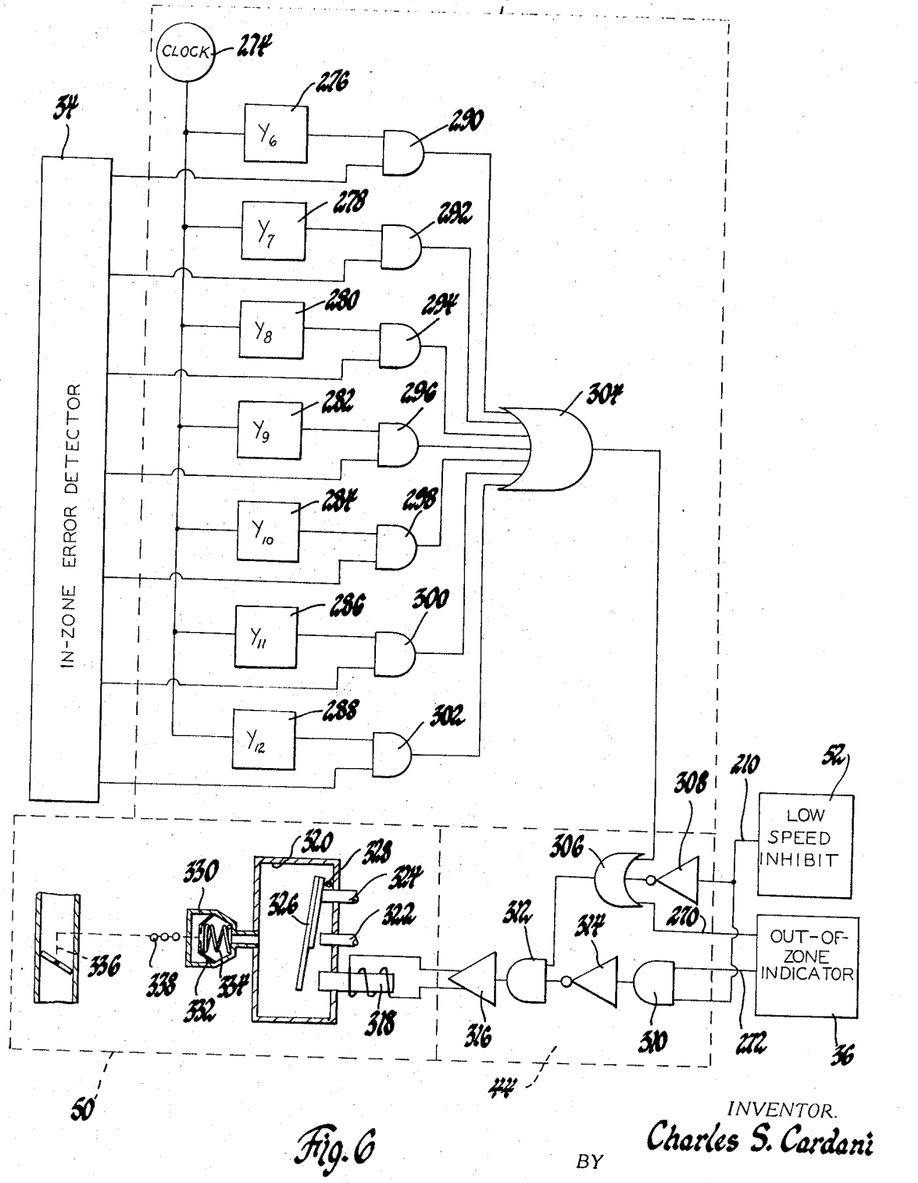
FIG. 6 is a schematic diagram of the proportional control signal generator, speed actuator drive logic circuit, and speed actuator of FIG. 1.

Referring to FIG. 6, the proportional control signal generator 42 takes the form of the signal generator which is the subject matter of Ser. No. 885,753, filed Dec. 17, 1969, now Pat. No. 3,586,985, and assigned to the assignee of the present invention, the specification of which is hereby incorporated by reference. Briefly, the proportional control signal generator 42 is comprised of a clock 274 which supplies a rectangular waveform to a series of leading edge time delay circuits 276, 278, 280, 282, 284, 286 and 288 having delay times $Y_6$, $Y_7$, $Y_8$, $Y_9$, $Y_{10}$, $Y_{11}$ and $Y_{12}$, respectively. The outputs of the leading edge time delay circuits 276, 278, 280, 282, 284, 286 and 288 are rectangular waveforms having a duty cycle determined by the respective delay times $Y_6$ through $Y_{12}$. In order to provide proportional control as a function of vehicle speed error, the output of the AND gates 240, 242, 244, 246, 248, 250 and 252 of the in-zone error detector 34 is supplied to the respective AND gate 290, 292, 294, 296, 298, 300 and 302 which is associated respectively with a time delay circuit 276, 278, 280, 282, 284, 286 or 288 providing the desired duty cycle. Therefore, the in-zone error as determined by the in-zone error detector 34 enables the AND gate 290, 292, 294, 296, 298, 300 and 302 which is associated with the desired duty cycle signal. The output of the AND gates 290, 292, 294, 296, 298, 300 and 302 are supplied to an OR gate 304 whose output is a waveform comprised of a series of 1 bits and 0 bits having a duty cycle corresponding to the in-zone error.

The speed actuator drive logic circuit 44 is comprised of an OR gate 306 which receives an input from the OR gate 304 in the proportional control signal generator 42, an input from an inverter 308 and an input from the out-of-zone indicator 36 through the line 270. The inverter 308 and an AND gate 310 receives an input from the low speed inhibit 52 through the line 210. The AND gate 310 also receives an input from the out-of-zone indicator 36 through the line 272. The output of the OR gate 306 is supplied to an input of an AND gate 312. The output of the AND gate 310 is supplied to an inverter 314 whose output is connected to an input of the AND gate 312. The output of the AND gate 312 is supplied to an amplifier 316.

The speed actuator 50 is comprised of a solenoid 318 which receives a current from the amplifier 316 in the speed actuator drive logic circuit 44 when the output of the AND gate 312 is a 1 bit. A mixing chamber 320 has a conduit 322 through which vacuum is admitted from a vacuum source which may be, for example, the vehicle manifold vacuum, 90 and a conduit 324 through which atmospheric air is admitted. The valve member 326 is biased to a first position by a spring member 328 so as to close the atmospheric air inlet through the conduit 324 and admit vacuum through the vacuum conduit 322. Valve member 326 is moved against the bias of the spring 328 by the solenoid 318 so as to close the vacuum inlet of the conduit 322 and open the atmospheric inlet of the conduit 324. The mixing chamber 320 is connected to a pneumatic motor 330 which is comprised of a diaphragm 332 and a spring 334. The diaphragm 332 is connected to a vehicle throttle 336 by means of a link 338. As the pressure within the mixing chamber 320 decreases below atmospheric pressure due to the admission of vacuum through the vacuum conduit 322, the diaphragm 332 is moved against the force of the spring 334 so as to move the link 338 and the attached throttle 336 to an open position. The throttle 336 is a conventional vehicle internal combustion engine throttle biased toward the closed position.

When the speed of the vehicle is below the minimun speed at which the vehicle may be controlled as determined by the low speed inhibit 52, the low speed inhibit 52 supplies a 0 bit to the input of the inverter 308 and to an input of the AND gate 310 through the line 210. The output of the inverter 308 is a 1 bit which enables the OR gate 306 to supply a 1 bit to the AND gate 312. The output of the AND gate 310 is a 0 bit supplied to the inverter 314 whose output is a 1 bit supplied to the AND gate 312. Since both inputs of the AND gate 312 are 1 bits, the output of the AND gate 312 is a 1 bit supplied to the amplifier 316. The output of the amplifier energizes the solenoid 318 to move the valve member 326 against the return force of the spring 328 to close off the vacuum inlet to the conduit 322 and admit atmospheric air to the conduit 324. The diaphragm 332 is moved by the spring 334 to allow the vehicle throttle 336 to close so as to provide maximum deceleration and to prevent the vehicle speed from being controlled.

When the speed of the vehicle is above the minimum controlled speed but underspeed out-of-zone, the out-of-zone indicator 36 supplies a 1 bit to the AND gate 310 through the line 272 and the low speed inhibit 52 supplies a 1 bit to the AND gate 310 through the line 210. The AND gate 310 is therefore enabled to supply a 1 bit to the inverter 314 which supplies a 0 bit to the AND gate 312. The output of the AND gate 312 is therefore a 0 bit supplied to the amplifier 316. The solenoid 318 is therefore deenergized to permit the valve member 326 to be returned by the force of the spring 328 to close off the atmospheric air input to the conduit 324 and to admit vacuum through the conduit 322. The diaphragm 332 is therefore moved against the force of the spring 334 to open the vehicle throttle and to provide for maximum acceleration. When the speed of the vehicle is in-zone, the out-of-zone indicator 36 supplies a 0 bit to the AND gate 310 through the line 272. The AND gate therefore supplies a 0 bit to the inverter 314 which supplies a 1 bit to the AND gate 312. The low speed inhibit 52 supplies a 1 bit through the line 210 to the inverter 308 which supplies a 0 bit to the OR gate 306. The out-of-zone indicator 36 supplies a 0 bit to the OR gate 306 through the line 270. In addition, the OR gate 306 receives an input from the OR gate 304 in the proportional control signal generator 42 which input is comprised of a series of 1 bits and 0 bits whereby the time relationship between the 1 bits and 0 bits is determined by the magnitude of the error as detected by the in-zone error detector 34. The output of the OR gate 304 therefore periodically enables the OR gate 306 to supply a 1 bit to the input of the AND gate 312. The output of the AND gate 312 is a series of 1 bits and 0 bits corresponding to the output of the OR gate 304 which are supplied to the amplifier 316 which periodically energizes and deenergizes the solenoid 318. As can be seen, the vacuum input through the conduit 322 and the atmospheric input through the conduit 324 is modulated to control the degree of vacuum within the mixing chambers 320 as a function of the output of the proportional control signal generator 42. Therefore, the vehicle throttle 336 is positioned by the movement of the diaphragm 332 against the return force of the spring 334 to a position corresponding to the vehicle speed error to provide for proportional control between maximum deceleration and maximum acceleration.

When the speed of the vehicle is overspeed in-zone, the out-of-zone indicator 36 supplies a 0 bit to the AND gate 310 whose output is a 0 bit supplied to the inverter 314. The inverter therefore supplies a 1 bit to the input of the AND gate 312. The out-of-zone indicator 36 supplies a 1 bit to the OR gate 306 through the line 270 to enable the OR gate 306 to supply a 1 bit to an input of the AND gate 312. Since both inputs of the AND gate 312 are 1 bits, the output of the AND gate 312 is a 1 bit supplied to the amplifier 316. The solenoid 318 is therefore continually energized to move the valve member 326 against the return force of the spring 328 to close the vacuum inlet through the conduit 322 and admit atmospheric air through the conduit 324. The diaphragm 332 is therefore moved by the spring 334 to permit the vehicle throttle 336 to close to provide for maximum deceleration.

The foregoing description provides for proportional control while the vehicle speed is in-zone as determined by the two lower ordered binary stages $B_1$ and $B_2$ in the countdown register 18 for illustration purposes only. As can be seen, the effectiveness of the proportional control can be enhanced by additionally utilizing yet higher ordered binary stages such as $B_3$ and $B_4$ for in-zone control with additional error decoding logic and with additional stages in the proportional control signal generator 42.

What has been described is a digital speed control system having the inherent capability of high tracking accuracy in which a binary number representing the vehicle speed error is periodically generated within a countdown register. This number is utilized to provide for either maximum acceleration when the desired speed of the vehicle exceeds the actual speed of the vehicle by a predetermined magnituide to provide for proportional speed control when the difference between the actual speed of the vehicle and the desired speed of the vehicle is within a predetermined magnitude, and to provide for maximum deceleration when the actual speed of the vehicle exceeds the desired speed of the vehicle by a predetermined magnitude.

I claim:

1. A digital speed control system for maintaining a desired speed of a controlled apparatus comprising, in combination, a memory register for storing a binary number; means for supplying a first pulse train having a number of pulses representing the desired speed of the controlled apparatus to the memory register, wherein the first pulse train steps the memory register to generate therein a binary number representing the desired speed of the controlled apparatus; a countdown register; means for cyclically transferring the binary number stored within the memory register to the countdown register, supplying a second pulse train having a number of pulses representing the actual speed of the controlled apparatus to the countdown register, and clearing the countdown register, wherein the second pulse train steps the countdown register to generate therein a binary number representing a controlled apparatus speed error; and means responsive to the binary number representing a controlled apparatus speed error for maintaining the desired speed.

2. A digital speed control system for maintaining a desired speed of a controlled apparatus comprising, in combination, a memory register for storing a binary number; means for generating a series of pulses having a frequency related to the speed of the controlled apparatus; means for supplying the series of pulses to the memory register for a specified duration of time when the speed of the controlled apparatus is at the desired speed, wherein the series of pulses steps the memory register to generate therein a binary number representing the desired speed; a countdown register; means for cyclically transferring the binary number stored within the memory register to the countdown register, supplying the series of pulses to the countdown register for the specified duration of time, and clearing the countdown register, wherein the series of pulses steps the countdown register to generate therein a binary number representing the difference between the desired speed and the actual speed of the controlled apparatus; and means responsive to the binary number representing the difference between the desired speed and the actual speed of the controlled apparatus for maintaining the desired speed.

3. The apparatus in claim 2 whereby the controlled apparatus is comprised of a vehicle having an internal combustion engine and means for supplying fuel thereto and the means responsive to the binary number representing the difference between the desired speed and the actual speed of the controlled apparatus includes the means for supplying fuel to the internal combustion engine.

4. A digital speed control system for maintaining a desired speed of a controlled apparatus comprising, in combination, a memory register for storing a binary number; means for generating a series of pulses having a frequency related to the speed of the controlled apparatus; means for supplying the series of pulses to the memory register for a specified duration of time when the speed of the controlled apparatus is at the desired speed, wherein the series of pulses steps the memory register to generate therein a binary number representing the desired speed; a countdown register; means for cyclically transferring the binary number stored within the memory register to the countdown register, supplying the series of pulses to the countdown register for the specified duration of time, and clearing the countdown register, wherein the series of pulses steps the countdown register to generate therein a binary number representing the difference between the desired speed and the actual speed of the controlled apparatus; and means responsive to the binary number generated within the countdown register for providing maximum acceleration or maximum deceleration when the error between the actual speed and the desired speed exceeds a predetermined magnitude and for providing varying degrees of acceleration or deceleration when the error between the actual speed and the desired speed is less than the predetermined magnitude, whereby the means responsive to the binary number generated within the countdown register is operative to maintain the desired speed.

5. The method of maintaining a desired speed of a controlled apparatus including the steps of generating a series of pulses having a frequency corresponding to the speed of the controlled apparatus; supplying the series of pulses to a memory register for a specified duration of time when the speed of the controlled apparatus is at the desired speed so as to step the memory register and store therein a binary number representing the desired speed of the controlled apparatus; cyclically transferring the binary number generated within the memory register to a countdown register, supplying the series of pulses to the countdown register for the specified duration of time so as to step the countdown register and generate therein a binary number representing the difference between the desired speed and the actual speed of the controlled apparatus, and utilizing the binary number representing the difference between the desired speed and the actual speed to maintain the desired speed.

6. A digital speed control system for maintaining a desired speed of a controlled apparatus comprising, in combination, a memory register for storing a binary number; means for generating a series of pulses having a frequency related to the speed of the controlled apparatus; means for supplying the series of pulses to the memory register for a specified duration of time when the speed of the controlled apparatus is at the desired speed, wherein the series of pulses steps the memory register to generate therein a binary number representing the desired speed; a countdown register having a plurality of stages; means for cyclically transferring the binary number stored within the memory register to respective stages in the countdown register, supplying the series of pulses to the countdown register for a specified duration of time, and clearing the countdown register, wherein the series of pulses steps the countdown register to generate therein a binary number representing the difference between the desired speed and the actual speed of the controlled apparatus; inverter means coupled to a selected number of the stages in the countdown register; means coupled to the selected number of stages in the countdown register and the inverter means for providing varying degrees of acceleration or deceleration of the controlled apparatus when the difference between the desired speed and the actual speed of the controlled apparatus is less than a predetermined magnitude; and means responsive to the binary number generated within the countdown register for providing maximum acceleration or maximum deceleration when the error between the actual speed and the desired speed of the controlled apparatus exceeds the predetermined magnitude.

7. A digital speed control for maintaining a motor vehicle at a preselected constant speed comprising: means for generating a first digital signal responsive to the actual speed of the vehicle comprising a series of speed signal pulses having a pulse repetition frequency proportional to the speed of the vehicle; means for generating a second digital signal responsive to a constant preselected vehicle speed comprising a digital reference clock, a first digital counter and means for clocking said first digital counter in response to said first digital signal during a first given reference clock period, thereby storing in said first digital counter a first digital number responsive to the preselected speeds of the vehicle; means for digitally comparing the first digital signal responsive to the actual speed of the vehicle and the second digital signal responsive to the constant preselected vehicle speed to produce a digital error signal, wherein said means comprises a second digital counter, means for loading said second digital counter with said first digital number at the beginning of a second given reference clock period, means for clocking said second digital counter in response to said first digital signal during said second given reference clock period, and means responsive to said second digital counter for producing said digital error signal; and means for adjusting the speed of the vehicle in response to said digital error signal to maintain the preselected constant speed.

8. A digital speed control for maintaining a motor vehicle at a preselected constant speed comprising:
   a. means for generating a series of digital speed pulses having a repetition rate proportional to the actual speed of the vehicle;
   b. a digital reference clock;
   c. a digital memory counter;
   d. means for clocking said digital counter in response to said speed pulses during a given reference clock period for storing in said digital counter a first digital number representative of a pre-selected vehicle speed;
   e. a counting register;
   f. means for cyclically transferring the first digital number from said digital counter to said register and for clocking said register in response to said speed pulses representative of the actual vehicle speed under the control of said digital clock for the given reference clock period to produce a digital error signal; and
   g. a throttle actuator for adjusting the speed of the vehicle in response to said digital error signal to maintain the selected speed.

* * * * *